United States Patent [19]
Germann

[11] 3,765,233
[45] Oct. 16, 1973

[54] DEVICE FOR MEASURING COMPRESSION OF PISTON ENGINES

[75] Inventor: Reimar Germann, Graz, Austria

[73] Assignee: Hans List, Graz, Austria

[22] Filed: Jan. 21, 1972

[21] Appl. No.: 219,624

[30] Foreign Application Priority Data
Jan. 26, 1971 Austria .................................. A 605/71

[52] U.S. Cl. ............................................... 73/117.2
[51] Int. Cl. ............................................... G01m 15/00
[58] Field of Search .................. 73/116, 117.2, 115

[56] References Cited
UNITED STATES PATENTS
3,421,367  1/1969  Mears et al. ........................ 73/116
3,630,076  12/1971  Staudt ............................... 73/117.3

Primary Examiner—Jerry W. Myracle
Attorney—Watson, Cole, Grindle & Watson

[57] ABSTRACT

A device is disclosed for measuring and checking the compression of piston engines. The battery voltage or the current to the starter motor is picked up by clamps or split-wire type transducers, and the AC-component representative of the compression is transmitted to a peak-to-peak measuring device. The peak-to-peak value is storaged during the time for one or more revolutions of the engine and for each cylinder separately. The compression of each cylinder is displayed in relation to the compression of the cylinder having the highest value of compression.

5 Claims, 8 Drawing Figures

DEVICE FOR MEASURING COMPRESSION OF PISTON ENGINES

BACKGROUND OF THE INVENTION

1. Field of the Invention

This invention is directed to a device for very simple and quick measurements and tests of the compression of piston engines and especially for the testing of combustion engines in vehicles without opening the combustion chamber.

2. Description of the Prior Art

In the testing of piston engines, and particularly of combustion engines in motor vehicles, knowledge of the maximum pressure of compression in the individual cylinders is of decisive significance. The known methods use pressure meters, most of which record the maximum pressure with a stylus. All of these methods have the disadvantage that the pressure-checking device measures the pressure in the combustion chamber and thus the combustion chamber must be opened, i.e., by the removal of the sparkplugs. This method is problematic or impossible when the checking of Diesel engines is involved. All of these measuring and checking methods are time-consuming and are accompanied by the danger that during the checking dirt could be introduced into the combustion chamber and cause damage.

Other methods are known which do not have these drawbacks. Thus, use is made of the fact that when the combustion engines is turned by the stator motor, the battery voltage or, respectively the current drawn from the starter motor is a measure for the compression pressure in the cylinder. With this method the voltage or current is usually presented on a strip-chart recorder or oscilloscope as a function of time and the curves so obtained are then visually examined and evaluated. The advantage of this method is that the combustion chamber need not be opened and that simple clamps or probes are connected to the battery or starter lines. A likewise known extension of this method provides for a marking of the first cylinder in the oscillogram. It is then possible, if the firing order is known, to identify the cylinder which has a poorer compression in comparison to the others. This marking signal is picked up from the ignition line of the first cylinder in gasoline engines and from the injection line to the first cylinder in Diesel engines via a suitable transducer (capacitive, inductive, piezoelectric, pressure switch).

A disadvantage of this method is the necessary visual and subjective evaluation of the oscillogram or the expensive but objective evaluation with a computer.

For most diagnostic applications for combustion engines it suffices, however, to know whether the maximum compression pressure of one of the cylinders varies by a given percent from the maximum pressure. Further, only the simplest manipulations and a possibility of objective evaluation, even from untrained personnel, are required.

SUMMARY OF THE INVENTION

The objective of the invention described below is to avoid the above-named disadvantages of the known methods and to fulfill the last-named advantage of the known methods, i.e., simple manipulation. Additionally, it should also be possible to introduce readily the result into the fully automated diagnostic systems which are being used increasingly commonly. To this end, provision is made in the invention that the battery voltage, or, respectively, the starter current, is picked up in a known way and that the alternate value is fed to a peak-to-peak measuring device via an AC amplifier or a high-pass filter, and that a fraction of the DC current proportional to the peak-to-peak value of the pure alternate value of the voltage or, respectively, the current is obtained via an adjustable voltage divider, preferably by a potentiometer with digital indication of the slide position via a digital knob and is fed into an input of a voltage comparator whose second input is directly connected to the input of a peak-to-peak measuring device and whose output is connected to the input of AND-gates corresponding in number to the cylinders in the combustion engine, while the second input to these AND-gates is connected to the output of a shift register with a number of stages corresponding to the number of cylinders. The clock inputs of the shift register are connected with a pickup — in the case of gasoline engines preferably with a capacitive clamp-on pickup in the coil-distributor connection cable — which delivers a pulse for each working stroke of each cylinder in the combustion engine, and the set input of the first stage of the shift register is connected with a pickup which delivers a pulse for every working stroke of the first cylinder. Further, the AND-gate outputs are connected to the inputs of flip-flops corresponding in number to the number of cylinders in the combustion engine. The outputs of these flip-flops trigger a display, preferably an incandescent or neon lamp or a luminescence diode. A common reset key for the resetting of the flip-flops is additionally provided.

During the turning of the starter, the different heights of compression of the temporarily shifted compression pressure maxima cause a variable torque during one turn or, in a four-stroke motor, during two turns of the combustion engine. As a result, the battery voltage or, respectively, starter current changes. This alternate value is fed on the one hand to a normal peak-to peak measuring device and on the other, to the input of a voltage comparator. The second input of the voltage comparator lies on a DC voltage the percentage value of which is proportional to the peak-to-peak value of the alternate value, and thus to the maximum pressure as well, and which is adjustable by a potentiometer. According to the invention, when less than the set percentage enters the input, a signal appears in the AND-gate corresponding to the cylinder which further triggers a flip-flop and display. The coordination of the AND-gates and the respective cylinders is accomplished with a signal per working stroke and cylinder, e.g., the ignition pulse and the synchronization via a signal from the first cylinder.

The main advantage of the invention is that after the opening of the reset key, which in the closed condition holds all the flip-flops in one stage, the stored, direct display is obtained of those cylinders whose compression pressure is less than a previously freely-chosen percentage of the maximum compression pressure. A further advantage is, according to the invention, that through continual turning of the potentiometer until the response of the display, the percentage deviation of each maximum compression pressure from the highest value may be read directly from a digital knob.

In further development of the invention the known peak-to-peak measuring device is provided with a discharge device, preferably a field-effect transistor, parallel to the storage capacitor, which is controllable by a monostable vibrator with constant delay time, whereby the monostable vibrator is triggered by a pickup which delivers a pulse for every working stroke and cylinder. A monostable vibrator with a single, firmly set but shorter time delay is connected to each of the outputs of the above described and like-functioning shift register, each of the outputs of which control the hold of a digital store. A fast A/D converter measures the peak-to-peak voltage with the arrival of a pulse per working stroke and cylinder and the result stored in a digital store corresponding to the cylinder, is either presented by a digital readout and/or is connected to a computer or a digital printer.

Further, it is possible to obtain a direct analog reading for each cylinder in place of the digital measurement of the maximum compression pressure, whereby according to the invention the peak-to-peak voltage for each cylinder is stored in a known analog store which is controlled by the shift register described above. The compression values for the respective cylinders are shown on corresponding analog meters.

With the last-described arrangement, the invention offers the advantage of running digital or analog readings of the individual compression pressures, with the possibility of data acquisition.

DESCRIPTION OF SPECIFIC EMBODIMENTS

According to FIG. 1, the voltage $V_B$ of the battery 1 is preferably picked up with clamps and subsequently applied to an AC amplifier 3. The AC amplifier has the task of taking off the pure AC component of the battery voltage. Naturally, a high-pass filter whose low frequency cutoff lies under the lowest possible starter speed can also be installed. During current measurements, the AC component may be picked up directly and easily with the use of split-core type current transformers.

Figure 2:
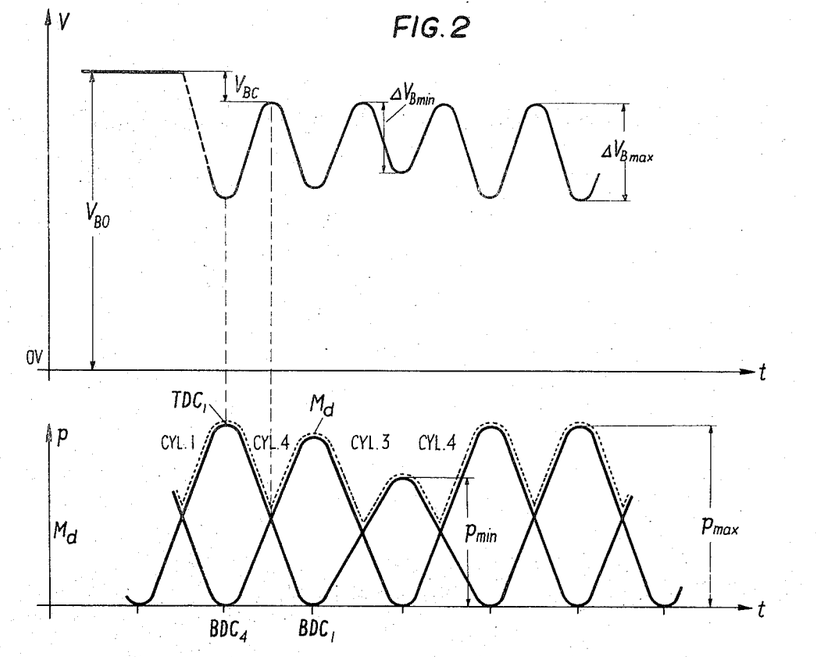
FIG. 2 shows the relationship between battery voltage and the compression pressures for a four-cylinder engine.

Now it may be shown in a simple manner with FIG. 2 that the alternating quantity—whether the battery voltage or that of the starter current — is directly related to the maximum pressures of compression in the individual cylinders. In the lower diagram of FIG. 2 the pressure-time ($p$-$t$) diagram of a four-cylinder four-stroke engine is shown. For cylinder 1, the top dead center $TDC_1$ is identical to the maximum compression pressure $P_{max}$, provided care is taken that no ignition of the gas mixture occurs. At the same time, the compression of cylinder 4 begins, depending on the firing order, at the bottom dead center $BDC_4$. The maximum compression pressure of cylinder 4 is attained at the top dead center $TDC_4$ with a 180° drive angle.

According to the condition of the individual cylinders, varying maximum compression pressures will be obtained. In FIG. 2 it is assumed that cylinder 3 has the lowest maximum compression pressure, $P_{min}$. The torque, $M_d$, has, in addition to a nearly constant component resulting from the described process, a variable component as shown in FIG. 2 by a dotted line. The result is that the electrical quantities of current and voltage show both a constant and alternating component, with the latter proportional to the maximum compression of the individual cylinder. In the upper part of FIG. 2 the voltage-time diagram pertaining to the $p$-$t$ diagram is shown.

At the beginning of the test the battery voltage is $V_{BO}$ subsequently decreasing by the value $V_{BC}$ corresponding to the constant component of the torque. The value of $V_{BC}$ is the internal resistance of the battery, i.e., its condition and the average compression of the internal combustion motor. At the time of maximum pressure of compression, i.e. at top dead center, the voltage decrease is greatest ($\Delta V_{Bmax}$). With slight compression-cylinder 3 in the example shown in FIG. 2, the voltage decrease is smallest ($\Delta V_{Bmin}$).

The AC component of the battery voltage or, respectively, the starter current, is in any case an illustration of the maximum pressure of compression in the individual cylinders and can be used in the evaluation of the compression of a combustion engine or of a compressor.

In the following space, for the sake of simplicity, only the measurement of the battery voltage will be shown as an example of the circuitry of the invention. The previous statements are valid, however, analogously, for the measurement of current, in which case the circuitry of the invention is the same, except for the recording of the alternating quantity.

Figure 3:
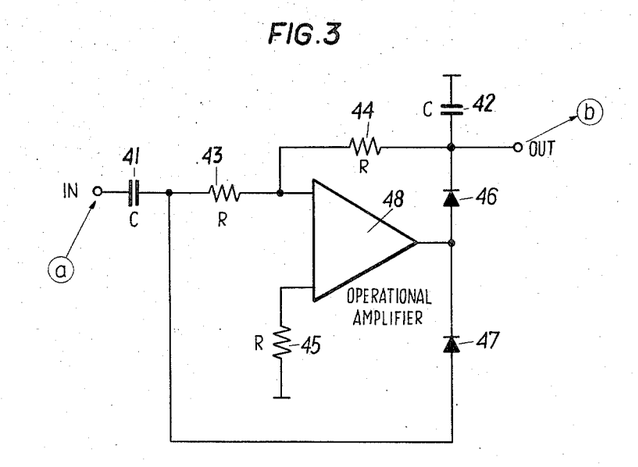
FIG. 3 presents a detail of the peak-to-peak value measuring device.

The alternating quantities appearing at the output of the AC amplifier or high-pass filter 3 are applied on the one hand to a peak-to-peak value measuring device and on the other to the input of a voltage comparator 7. For the peak-to-peak measurements a known circuit shown in FIG. 3 in detail may be used. With this circuit, capacitors 41 and 42 are charged by operational amplifier 48 and diodes 46 and 47. Output magnitude b, which is proportional to the maximal peak-to-peak value of input value a, is determined by the ratio of resistances 43 and 44.

The output voltage of the peak-to-peak voltmeter is divided by a voltage divider 5 whose division ratio may be chosen continuously with a potentiometer 6 or, preferably, with a digital knob designed to be set for a percentage of the maximal amplitude. The tapped voltage c (see also pulse diagram, FIG. 4) is applied to the second input of voltage comparator 7. Thus, when the input AC voltage a is greater than the voltage c preselected with potentiometer 6, a pulse d appears at the output of voltage comparator 7. If the selected voltage level is not attained, as with, e.g., cylinder 3, no pulse appears.

Figure 4:
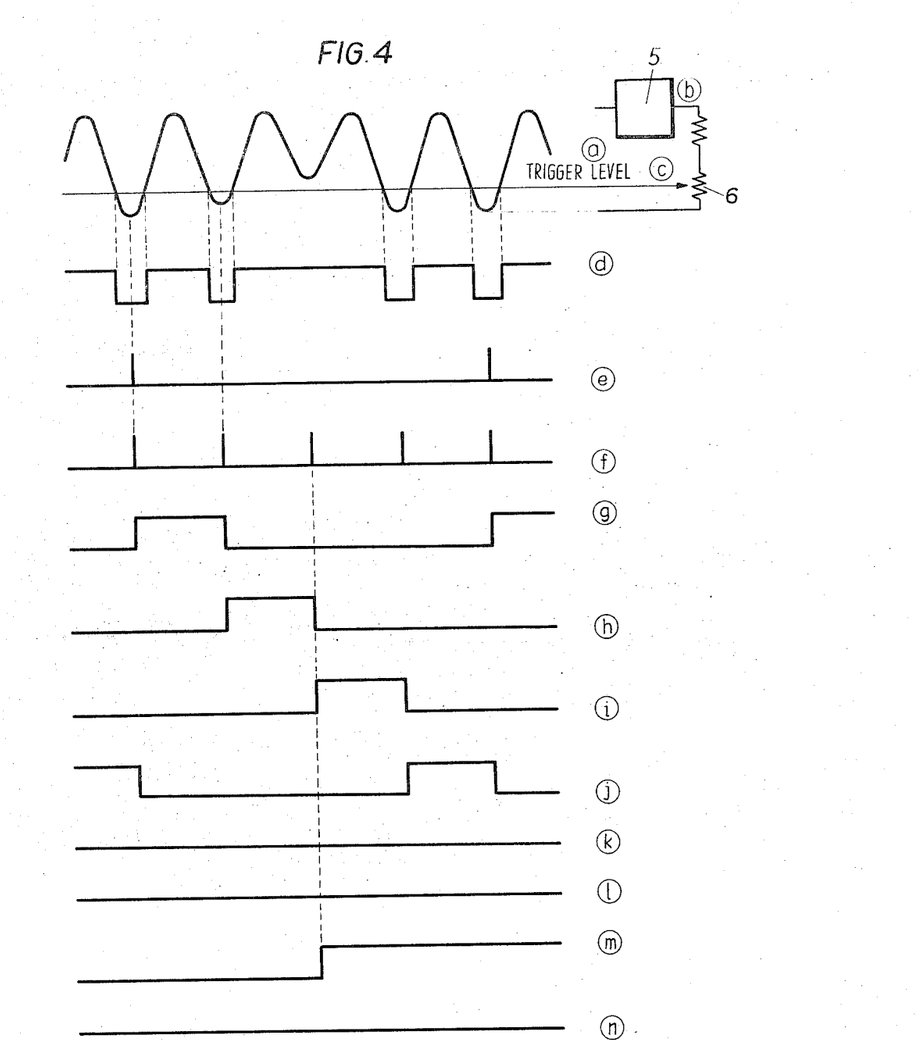
FIG. 4 shows a pulse schedule for further clarification of the function of the invention according to FIG. 1.

In order to obtain information on the individual cylinders, the invention provides for a shift register which runs synchronously with the combustion engine and whose number of stages is equal to the number of cylinders. At the outputs of the individual stages of the shift register a square pulse $g, h, i, j$ appears for the duration of a sequence of two ignition pulses which, as may be seen from the pulse plan in FIG. 4, is delayed by one stroke.

The stroke pulse for the shift register is delivered by a pickup 10, which is preferably capacitative and in the form of a clamp, which is included in the circuit 16 between ignition boil 18 and distributor 9. Thus, with every firing a pulse f is delivered. The synchronization of the shift register is accomplished by a pulse e from the pickup 11 which is connected to the ignition line 17 to cylinder 1. It is thus assured that the first step $12_1$ of the shift register is coordinated with cylinder 1 with certainty. In order to obtain a stored display a flip-flop $14_1 - 14_4$ is provided for each cylinder. These are controlled by the AND gates 13 and the outputs control a display 15 with incandescent or neon lamps or a luminescence diode $15_1 - 15_4$, which are provided with an indication of the cylinder number. The stored display persists until a general reset with key 18 is performed.

It is obvious that according to the invention it is possible to determine the amount by which the compression of a cylinder deviates from the maximum value by continually turning the potentiometer 6 until a lamp 15 lights. This procedure may be carried out for all the cylinders in turn.

Figure 1:
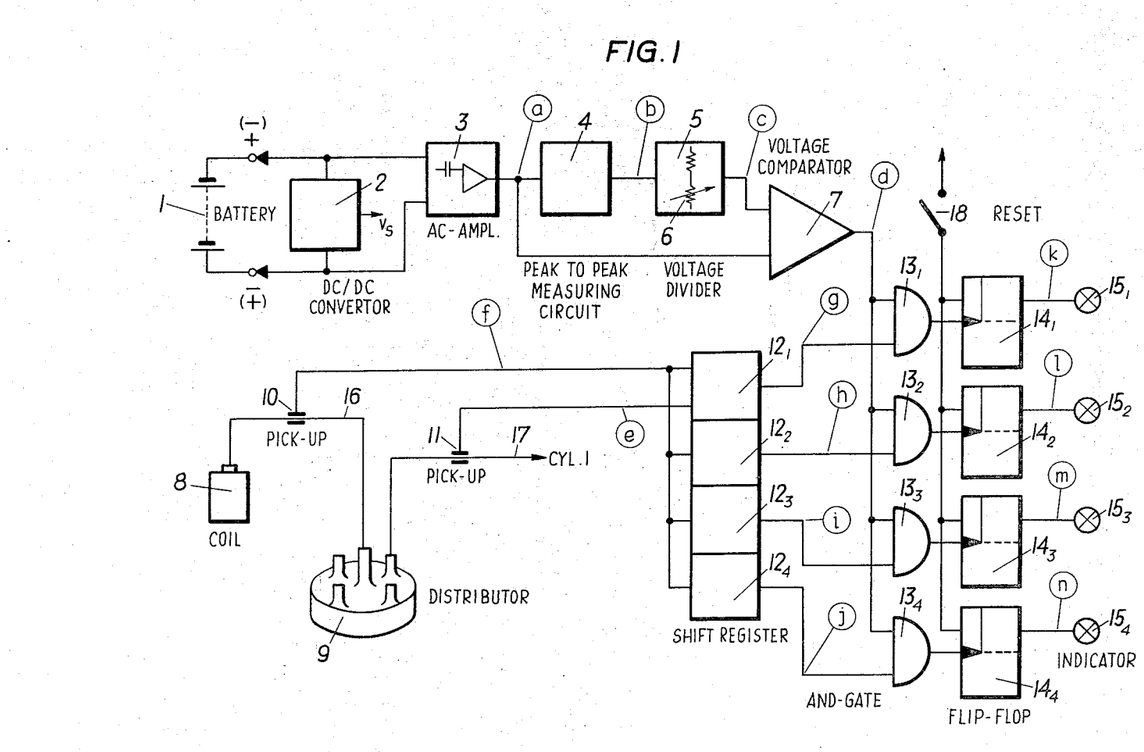
FIG. 1 is a block diagram of the circuitry of the invention.

Independence from the supply line is attained by the fact that, as shown in FIG. 1, a DC-DC converter with feedback regulation delivers the supply voltage for the circuit directly from the vehicle battery. This renders the circuit independent of the magnitude of the battery voltage and separate supplies.

Figure 5:
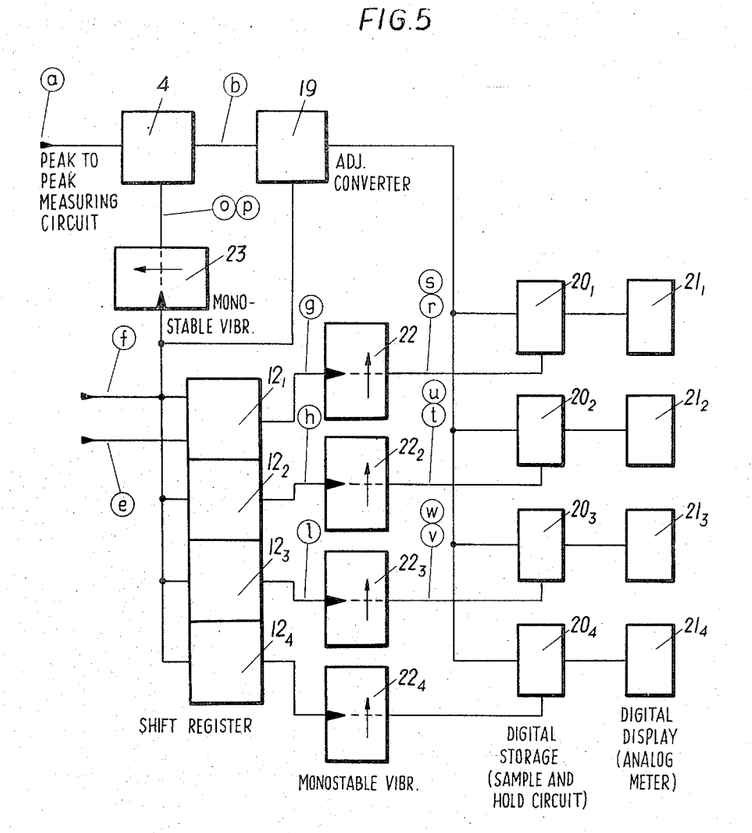
FIG. 5 is a block diagram of a further circuit according to the invention.
Figure 6:
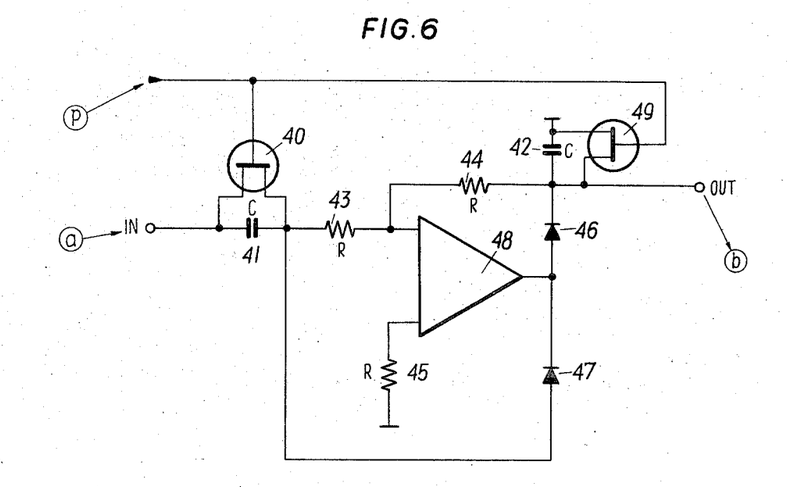
FIG. 6 shows a detail of a peak-to-peak value measuring device with automatic reset.

In place of the above described arrangement with a simple GO- NO GO decision display, a circuit corresponding to FIG. 5 delivers a digital display of each maximum pressure of compression in percentages of the highest value to appear. This circuit is based on that described above for the obtaining of a voltage or current proportional to the maximum pressure of compression as well as on shift register 12 which operates synchronously with the engine RPMs. The known circuit described above for measurement of the peak-to-peak value is, additionally, as shown in the circuit detail in FIG. 6 parellel to the storage capacitors 41 and 42 which are provided with a field-effect transistor 40 and 49. The gate electrodes of the field-effect transistors are connected in parallel and are controlled by pulses p (see also pulse schedule in FIG. 7) which are delayed by a period $t_1$ from pulse $f$ via a monostable vibrator 25. This results in a discharge of the storage capacitors after every working stroke. It may be seen from the pulse plan shown in FIG. 7 (which for the sake of clarity shows only three cylinders) that following the attainment of the upper and lower peak values of curve $a$ accumulation continues until the next discharge. See also the thinly-drawn curve $b$ in FIG. 7. The peak-to-peak values $\Delta V_{B1}$, $\Delta V_{B4}$ and $\Delta V_{B3}$ are thus available for the time $t_1$ during each working stroke. A fast A/D converter 19, preferably sawtooth coded, is startet beginning with the appearance of pulse $f$ and released by this pulse. The digital value is then fed to the digital store 20. Then, after time $t_2$, which must be equal to the maximum measuring time of the A/D converter, the digital values are taken up by the digital stores $20_1 - 20_4$ corresponding to the respective cylinders via transfer pulses s,t,v. The measured values are then retained in the digital stores until the arrival of a transfer pulse, and displayed on the digital displays $21_1 - 21_4$ preferably with alpha-numeric tubes or optoelectronic solid-state numerical displays. The percentage compressions of all the cylinders are thus simultaneously available in the digital display for one turn or, for a four-stroke engine for two turns. The displayed result is automatically corrected for each working stroke and cylinder.

The assignment of the displays to the individual cylinders is accomplished in a manner similar to that shown in the circuit in FIG. 1 in which a monostable vibrator $21_1 - 22_4$ with a running time of $t_1$ is connected to the individual stages of the shift register 12. These deliver the pulses, delayed by time $t_1$ for transmission to the digital store 20. Of particular importance is the fact that the reset pulse p for the discharge of the peak-to-peak meter may appear only after the conclusion of transmission into the digital store. This assures that the delay time $t_1$ of the monostable vibrator 23 is greater than the time $t_2$ of the monostable vibrators $22_1 - 22_4$.

Figure 7:
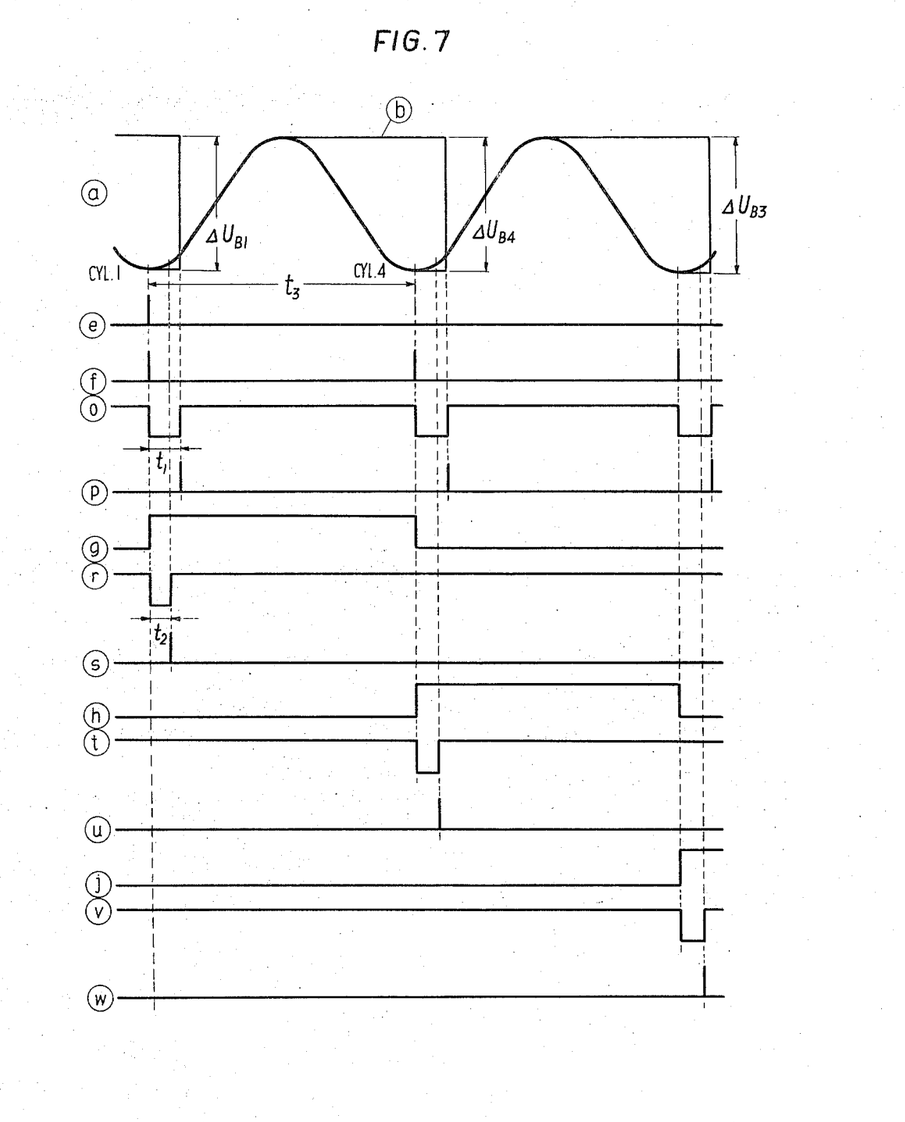
FIG. 7 depicts a pulse schedule for further explanation on the function of the invention according to FIG. 5.

It should be pointed out that the times $t_1$ and $t_2$, of the order or magnitude of some milliseconds, are very small in comparison to the period $t_3$ (ca. 0.3 - 0.5 sec) of curve $a$ in FIG. 7. For the sake of better presentation, however, the relationship of these times is shown strongly distorted in the pulse schedule in FIG. 7.

Figure 8:
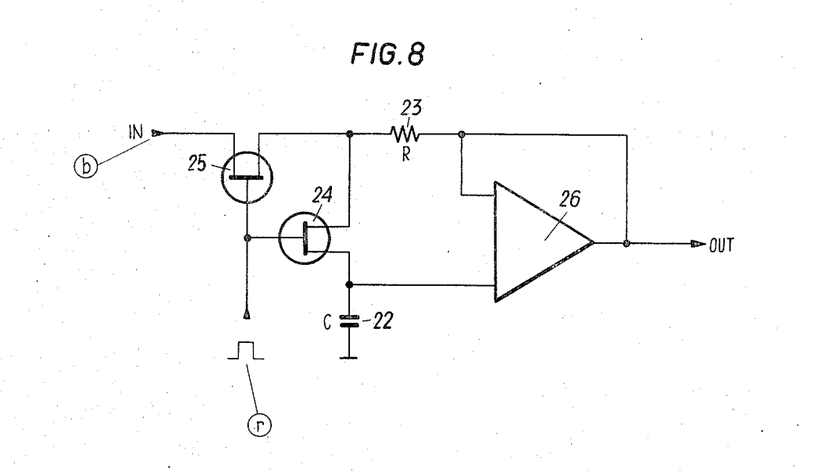
FIG. 8 presents a detail of a controllable analog store.

Under the provisions of another variation of the circuit, the A/D converter 19 in FIG. 5 is eliminated and the stored peak values b are picked up by an analog store for each cylinder during the running time $t_2$ of the monostable vibrators $22_1 - 22_4$. A circuit detail of a known analog store ("sample- and-hold" circuit) is shown in FIG. 8. Both FETs 24 and 25, preferably with insulated grid (MOS FET) are activated by the pulse r,v, or t assigned by the shift register to the respective cylinder, whereby the analog value $\Delta U_{B1}$ ($\Delta U_{B2}$, $\Delta U_{B3}$, $\Delta U_{B4}$) charges the capacitor 22. After time $t_2$ this value is stored in capacitor 22. It must, hoever, be ascertained that, for example, with use of voltage sources with low internal resistance, the capacitor 22 is indeed charged up to value $U_{B1}$ during time $t_2$. With a sufficiently high input resistance of operational amplifier 26, the analog value will be stored for a considerable time. An analog display for each cylinder is connected to the output of op-amp 26. The percentage compression pressure of all the cylinders can thus be read simultaneously.

We claim:

1. An apparatus for measuring and testing the compression in the cylinders of a piston engine, comprising:

a measuring device for storing the maximum peak-to-peak value of an alternating signal proportional to the torque occurring during one full working cycle of the piston engine, an adjustable potentiometer for establishing a set voltage ratio and having an input connected to the output of said measuring device, a voltage comparator with a first and a second input, said first input being connected to the output of said potentiometer, said second input being connected to the input of said measuring device, a number of AND gates corresponding to the number of cylinders of the piston engine, each AND gate having a first and a second input, the first inputs of all AND gates being connected to the output of said voltage comparator, a number of bistable vibrators corresponding to the number of cylinders and each having a pulse input and a resetting input, the pulse input of each one of the bistable vibrators being connected to one of said AND gates, the resetting inputs of all bistable vibrators being connected to a common reset key, a number of optical indicators corresponding to the number of cylinders and each respectively connected to the output of one of said bistable vibrators, a first pulse generator for releasing a pulse for each working stroke of each cylinder, a second pulse generator for releasing a pulse for each working stroke of the first cylinder of the engine, a shift register with a number of stages corresponding to the number of cylinders of the engine, each stage of the shift register having a shift-stroke input, a set input and an output, the shift-stroke inputs of all stages being connected to said first pulse generator, the set input of one of the stages of the shift register being connected to said second pulse generator, and the outputs of said stages being connected with the second input of a respective one of said AND gates.

2. A device according to claim 1, wherein said alternating signal is the battery voltage and further comprising an a.c. voltage amplifier for feeding said signal to the input of said measuring device and to the second input of said voltage comparator.

3. A device according to claim 1, wherein the adjustable voltage divider is a potentiometer providing a digital indication of the slider position.

4. A device according to claim 1, wherein the optical indicators are incandescent or glow lamps.

5. A device according to claim 1, further comprising a d.c.-to-d.c. voltage converter for supplying a supply voltage, said converter being fed by the battery of the piston engine.

* * * * *